J. C. Parrish,
Animal Trap.
No. 111,673. Patented Feb. 7, 1871.
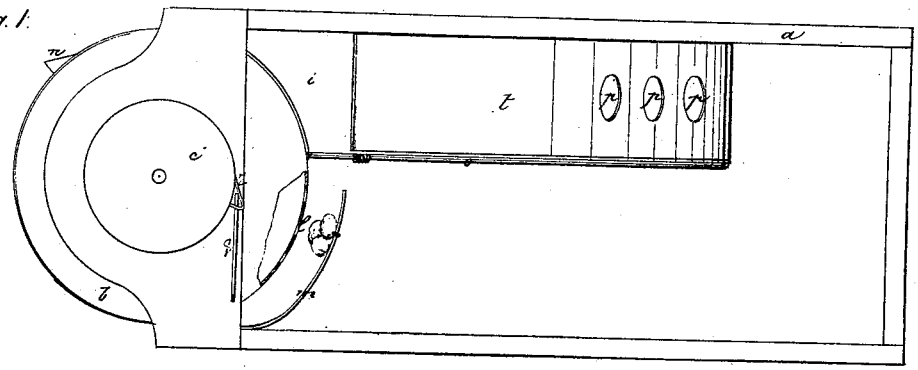
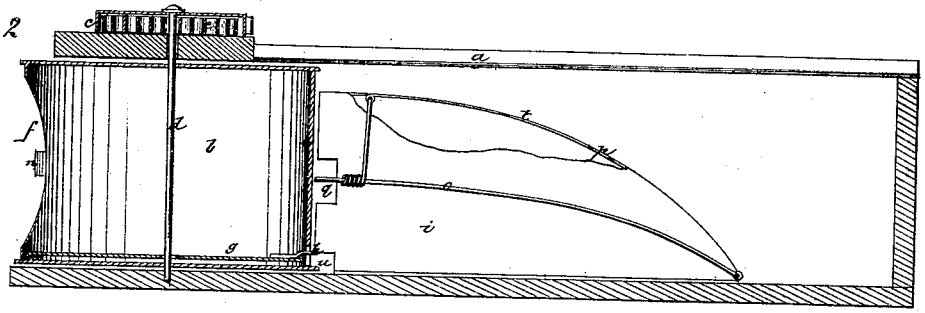
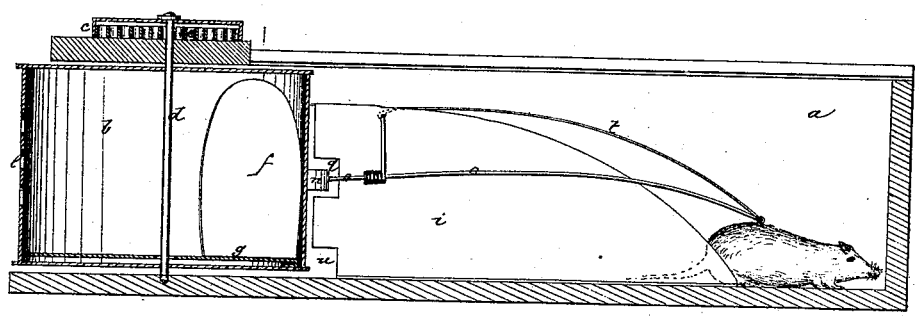
Witnesses: Inventor:
Jas. Caswell Parrish,
PER
Attorneys.

United States Patent Office.

JAMES C. PARRISH, OF PETERSBURG, VIRGINIA.

Letters Patent No. 111,673, dated February 7, 1871.

IMPROVEMENT IN ANIMAL-TRAPS.

The Schedule referred to in these Letters Patent and making part of the same.

*To all whom it may concern:*

Be it known that I, JAMES C. PARRISH, of Petersburg, in the county of Dinwiddie and State of Virginia, have invented a new and improved Animal-Trap; and I do hereby declare the following to be a full, clear, and exact description of the same, reference being had to the accompanying drawing making a part of this specification, in which—

Figure 1 is a plan view, and

Figures 2 and 3 are sectional elevations.

This invention relates to a trap in which the animal first enters, by an opening in the side, a vertical cylinder mounted on pivots and provided with a coiled spring arranged, when wound up, to impart a rotary motion to the chamber whenever a certain stop is withdrawn, and in which the animal withdraws said stop by depressing in his efforts to reach the bait, the false spring-bottom of the cylinder, the latter then whirling far enough around to bring the aforesaid opening in its side opposite a box placed next to the cylinder, which box the animal enters, attracted by holes at its other end which admit light, and from which box the animal escapes by raising its cover on its hinges and creeping under, whereupon the animal finds itself entrapped in an inclosing-case from which there is no escape, the cylinder meantime having been once more whirled by its spring through the action of the animal in raising the hinged box far enough around to bring the opening in its side again to the front, thus resetting the trap.

Referring to the drawing—

*a* is the inclosing-case.

*b* is the cylinder, mounted at and filling the front and open end of the case.

*d* is the vertical shaft on which the cylinder is placed.

*c* is a case placed on the shaft *d* above the case *a*, and containing the coiled spring *e*, that rotates the cylinder.

*f* is the opening at the side of the cylinder through which the animal enters.

*g* is the false spring-bottom of the cylinder.

*h* is a pin secured to the free side of the spring-bottom, and extending through the side of the cylinder, so as to form a stop to the rotation of the latter by striking the side of the hinged box *i*.

*l* are holes in the side of the cylinder on the opposite side from the orifice *f*, which holes the animal approaches in order to get at the bait, that is secured to the partition *m* near the holes and outside the cylinder, by which movement of the animal the spring-floor is depressed so far as to lower the pin *h* below the projection *m* at the end of the box *i*, whereupon the cylinder is instantly whirled around by the spring *e* till the opening *f* is opposite the front end of the box *i*, at which movement a projection, *n* on the outside of the cylinder strikes a wire, *o*, attached to the cover *t* of the box *i*, by which wire the cylinder is stopped.

*p* are the holes in the inclined cover *t* of the box *i*, toward which the animal then proceeds, reaching which, the animal pushes itself along under the cover till he raises the latter far enough to enable him to pass out from beneath it, when it falls.

The raising of the cover in this manner depresses the end of the wire *o* below the projection *n*, whereupon the cylinder is again whirled by the spring *e*, the projection *n* passing through the recess *q* in the side of the box *i*. This rotation of the cylinder continues until the pin *h* once more strikes the side of the box *i* and the opening *f* is again at the front of the case *a*, thus resetting the trap and closing the front end of the box *i* so as to shut off the light.

The animal, after emerging from the box *i*, finds itself securely entrapped in the case *a*, whence there is no escape. The case *a* should be provided with a glass top to admit light.

The case *c* has a projection, *r*, at one side, in which projection is an orifice through which a rod, *s*, enters, the function of said rod being to prevent the rewinding of the spring *e*.

Having thus described my invention,

What I claim as new, and desire to secure by Letters Patent, is—

The cylinder *b*, having the projection *n*, the opening *f*, and orifice *l*, in combination with the spring *e*, the spring false bottom *g*, provided with the pin *h*, the box *i*, provided with the recesses *q u*, and the hinged cover *t*, perforated at *p* and provided with the wire *o*, all arranged and operating as described.

To the above specification of my invention I have signed my hand this 5th day of January, A. D. 1871.

JAMES C. PARRISH.

Witnesses:
THOS. D. D. OURAND,
CHAS. A. PETTIT.